(12) United States Patent
Yi et al.

(10) Patent No.: US 11,411,705 B2
(45) Date of Patent: *Aug. 9, 2022

(54) METHOD AND APPARATUS FOR HANDLING STARTING SUBFRAME OF CONTROL CHANNEL FOR MTC UE IN WIRELESS COMMUNICATION SYSTEM

(71) Applicant: LG ELECTRONICS INC., Seoul (KR)

(72) Inventors: Yunjung Yi, Seoul (KR); Hyangsun You, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

This patent is subject to a terminal disclaimer.

(21) Appl. No.: 16/932,411

(22) Filed: Jul. 17, 2020

(65) Prior Publication Data

US 2020/0351062 A1    Nov. 5, 2020

Related U.S. Application Data

(63) Continuation of application No. 15/556,271, filed as application No. PCT/KR2016/002264 on Mar. 7, 2016, now Pat. No. 10,749,656.

(Continued)

(51) Int. Cl.
*H04L 5/00* (2006.01)
*H04W 4/70* (2018.01)
(Continued)

(52) U.S. Cl.
CPC .......... *H04L 5/0064* (2013.01); *H04L 5/0037* (2013.01); *H04W 4/70* (2018.02);
(Continued)

(58) Field of Classification Search
None
See application file for complete search history.

(56) References Cited

U.S. PATENT DOCUMENTS 9,503,239 B2 * 11/2016 Larsson ................ H04L 5/0053
10,396,965 B2    8/2019 Yi
(Continued)

FOREIGN PATENT DOCUMENTS

| CN | 104365165 | 2/2015 |
|---|---|---|
| WO | 2013/073924 A1 | 5/2013 |
| WO | 2014110757 | 7/2014 |

OTHER PUBLICATIONS

United States Patent and Trademark Office U.S. Appl. No. 15/554,960, Office Action dated Nov. 30, 2018, 18 pages.

(Continued)

*Primary Examiner* — Lonnie V Sweet
(74) *Attorney, Agent, or Firm* — Lee, Hong, Degerman, Kang & Waimey PC

(57) ABSTRACT

A method and apparatus for transmitting a control channel to a machine-type communication (MTC) user equipment (UE) in a wireless communication system is provided. A base station (BS) configures a period of a control channel by using a first set of subframes which can be used for a MTC UE and a second set of subframes which cannot be used for the MTC UE, and transmits the control channel to the MTC UE in the first set of subframes within the period. A user equipment (UE) derives a starting subframe of the control channel among starting subframe sets of the control channel within the period of the control channel, and monitors the control channel from the starting subframe of the control channel.

15 Claims, 18 Drawing Sheets

Related U.S. Application Data

(60) Provisional application No. 62/244,729, filed on Oct. 21, 2015, provisional application No. 62/232,420, filed on Sep. 24, 2015, provisional application No. 62/213,111, filed on Sep. 2, 2015, provisional application No. 62/210,943, filed on Aug. 27, 2015, provisional application No. 62/143,808, filed on Apr. 7, 2015, provisional application No. 62/141,254, filed on Mar. 31, 2015, provisional application No. 62/129,716, filed on Mar. 6, 2015.

(51) Int. Cl.
*H04W 76/27* (2018.01)
*H04W 72/04* (2009.01)
*H04W 88/02* (2009.01)
*H04W 88/08* (2009.01)
*H04W 76/14* (2018.01)

(52) U.S. Cl.
CPC ..... *H04W 72/044* (2013.01); *H04W 72/0406* (2013.01); *H04W 72/0446* (2013.01); *H04W 76/27* (2018.02); *H04L 5/006* (2013.01); *H04L 5/0007* (2013.01); *H04W 76/14* (2018.02); *H04W 88/02* (2013.01); *H04W 88/08* (2013.01)

(56) References Cited

U.S. PATENT DOCUMENTS

| | | | |
|---|---|---|---|
| 2009/0238241 | A1 | 9/2009 | Hooli et al. |
| 2011/0286349 | A1 | 11/2011 | Tee et al. |
| 2013/0176995 | A1 | 7/2013 | Park et al. |
| 2013/0294399 | A1 | 11/2013 | Lee |
| 2013/0301552 | A1 | 11/2013 | Xu et al. |
| 2013/0322493 | A1 | 12/2013 | Jersenius et al. |
| 2014/0098761 | A1 | 4/2014 | Lee et al. |
| 2014/0171073 | A1 | 6/2014 | Kim et al. |
| 2014/0301302 | A1 | 10/2014 | Xu et al. |
| 2015/0117233 | A1 | 4/2015 | Wong et al. |
| 2015/0131579 | A1* | 5/2015 | Li ............. H04L 1/0072 370/329 |
| 2015/0208415 | A1 | 7/2015 | Xu et al. |
| 2016/0029331 | A1 | 1/2016 | Seo et al. |
| 2016/0050687 | A1 | 2/2016 | Chen et al. |
| 2016/0183231 | A1 | 6/2016 | Shi et al. |
| 2016/0192323 | A1* | 6/2016 | Kim ............. H04W 52/0216 455/458 |
| 2016/0192333 | A1* | 6/2016 | Wang ............. H04W 72/042 370/329 |
| 2016/0227580 | A1 | 8/2016 | Xiong et al. |
| 2016/0242212 | A1 | 8/2016 | Wong et al. |
| 2016/0338018 | A1* | 11/2016 | Awad ............. H04L 5/0053 |
| 2016/0345117 | A1* | 11/2016 | Nguyen ............. H04W 4/70 |
| 2016/0353440 | A1 | 12/2016 | Lee et al. |
| 2017/0164335 | A1 | 6/2017 | Yamamoto et al. |
| 2018/0054291 | A1 | 2/2018 | Yi et al. |
| 2018/0249440 | A1* | 8/2018 | Zhang ............. H04W 68/02 |

OTHER PUBLICATIONS

PCT International Application No. PCT/KR2016/002265, International Search Report dated Jun. 29, 2016, 3 pages.
LG Electronics, "Considerations on coverage enhancement for MTC", 3GPP TSG RAN WG1 Meeting #79, R1-144890, Nov. 2014, 6 pages.
Huawei, "Data channel transmission for MTC UEs", 3GPP TSG RAN WG1 Meeting #80, R1-150040, Feb. 2015, 5 pages.
Panasonic, "MTC timing design", 3GPP TSG RAN WG1 Meeting #80, R1-150308, Feb. 2015, 4 pages.
United States Patent and Trademark Office U.S. Appl. No. 16/420,593, Office Action dated Sep. 1, 2020, 48 pages.
United States Patent and Trademark Office U.S. Appl. No. 16/420,593, Notice of Allowance dated Feb. 18, 2021, 9 pages.
PCT International Application No. PCT/KR2016/002264 International Search Report dated Jun. 29, 2016, 2 pages.
Huawei, HiSilicon, "Uplink Control Channel Design for MTC UEs," 3GPP TSG RAN WG1 Meeting #80, R1-150061, Athens, Greece, Feb. 2015, 6 pages.
Panasonic, "Consideration on Data Channel and Associated Control Channel for MTC," 3GPP TSG RAN WG1 Meeting #79, R1-144797, San Francisco, CA, Nov. 2014, 5 pages.
Huawei, HiSilicon, "Control Channel Support for Non-MTC UEs," 3GPP TSG RAN WG1 Meeting #79, R1-145100, San Francisco, CA, Nov. 2014, 2 pages.
United States Patent and Trademark Office U.S. Appl. No. 15/554,960, Notice of Allowance dated Mar. 22, 2019, 13 pages.
The State Intellectual Property Office of the People's Republic of China Application Serial No. 201680022102.0, Office Action dated Feb. 25, 2019, 6 pages.
Nec, "Frequency hopping schemes for LTE Rel-13 MTC", R1-150286, 3GPP TSG RAN WG1 Meeting #80, Feb. 2015, 4 pages.
United States Patent and Trademark Office U.S. Appl. No. 15/556,271, Office Action dated Dec. 31, 2018, 10 pages.
United States Patent and Trademark Office U.S. Appl. No. 15/556,271, Final Office Action dated Jul. 5, 2019, 10 pages.
United States Patent and Trademark Office U.S. Appl. No. 15/556,271, Office Action dated Dec. 23, 2019, 12 pages.
United States Patent and Trademark Office U.S. Appl. No. 15/556,271, Notice of Allowance dated Apr. 6, 2020, 11 pages.

* cited by examiner

METHOD AND APPARATUS FOR HANDLING STARTING SUBFRAME OF CONTROL CHANNEL FOR MTC UE IN WIRELESS COMMUNICATION SYSTEM

CROSS-REFERENCE TO RELATED APPLICATIONS

This application is a continuation of U.S. patent application Ser. No. 15/556,271, filed on Sep. 6, 2017, which is the National Stage filing under 35 U.S.C. 371 of International Application No. PCT/KR2016/002264, filed on Mar. 7, 2016, which claims the benefit of U.S. Provisional Application Nos. 62/129,716 filed on Mar. 6, 2015, 62/141,254 filed on Mar. 31, 2015, 62/143,808 filed on Apr. 7, 2015, 62/210,943 filed on Aug. 27, 2015, 62/213,111 filed on Sep. 2, 2015, 62/232,420 filed on Sep. 24, 2015, and 62/244,729 filed on Oct. 21, 2015, the contents of which are all hereby incorporated by reference herein in their entirety.

BACKGROUND OF THE INVENTION

Field of the Invention

The present invention relates to wireless communications, and more particularly, to a method and apparatus for handling a starting subframe of a control channel for a machine-type communication (MTC) user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

For efficient MTC transmission method, a new frame structure for MTC transmission has been discussed lately. Further, various enhancements of MTC transmission method based on the new frame structure for MTC have also been considered.

SUMMARY OF THE INVENTION

The present invention provides a method and apparatus for handling a starting subframe of a control channel for a machine-type communication (MTC) user equipment (UE) in a wireless communication system. The present invention provides a transmission structure to transmit broadcast and unicast while frequency hopping and half-duplex frequency division duplex (FDD) (or time division duplex (TDD)) are assumed. The present invention provides a method and apparatus for configuring a period of a control channel and/or dealing with 1024 radio frame wrap-around issue.

In an aspect, a method for transmitting, by a base station (BS), a control channel to a machine-type communication (MTC) user equipment (UE) in a wireless communication system is provided. The method includes configuring a period of a control channel by using a first set of subframes which can be used for a MTC UE and a second set of subframes which cannot be used for the MTC UE, and transmitting the control channel to the MTC UE in the first set of subframes within the period.

In another aspect, a method for monitoring, by a machine-type communication (MTC) user equipment (UE), a control channel in a wireless communication system is provided. The method includes deriving a starting subframe of a control channel among starting subframe sets of the control channel within a period of the control channel, and monitoring the control channel from the starting subframe of the control channel. The period of the control channel is configured by using a first set of subframes which can be used for the MTC UE and a second set of subframes which cannot be used for the MTC UE.

A MTC UE can monitor a control channel from a starting subframe efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
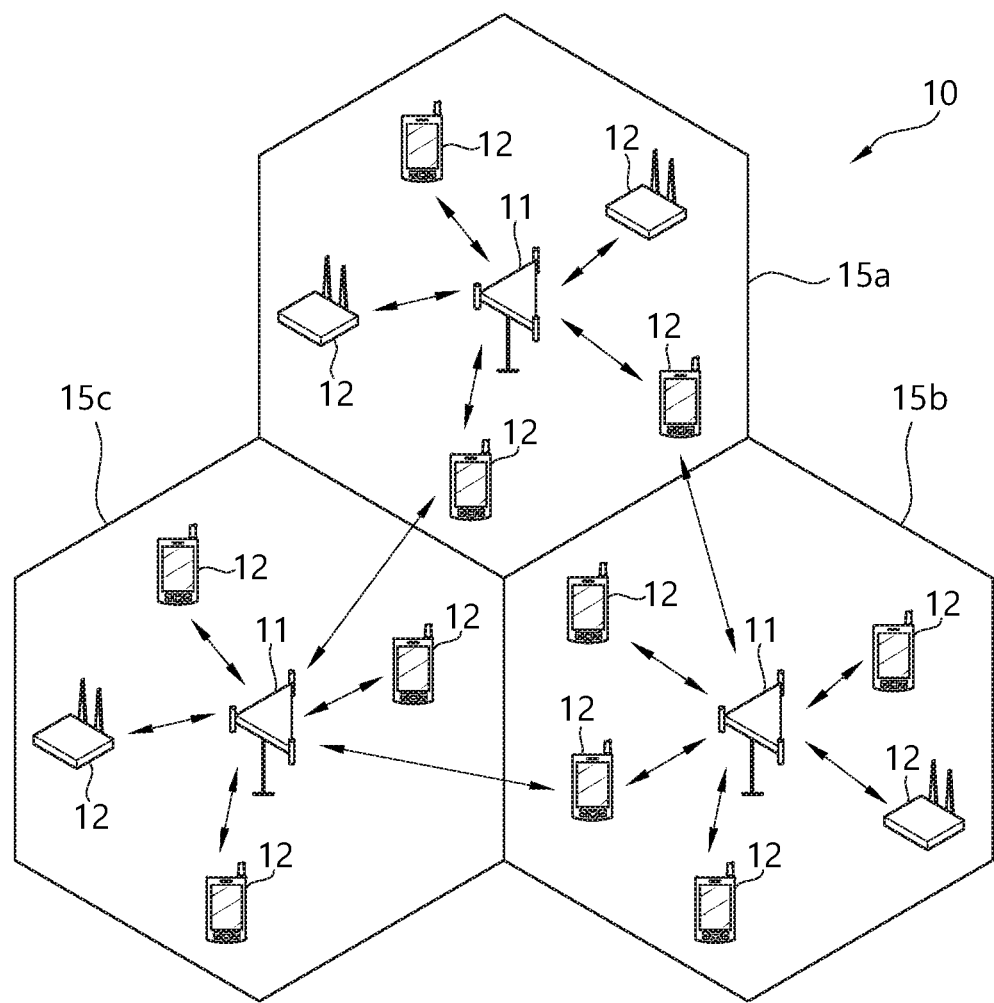
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
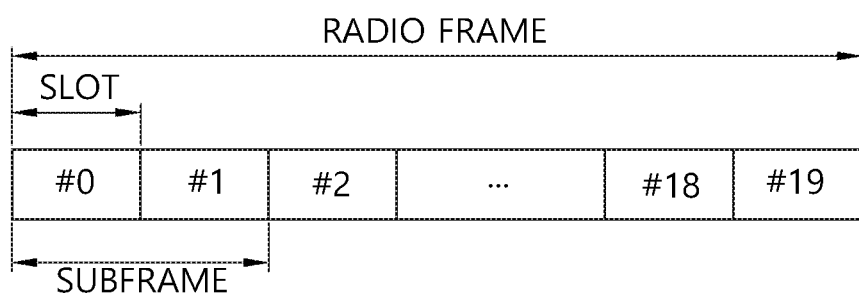
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
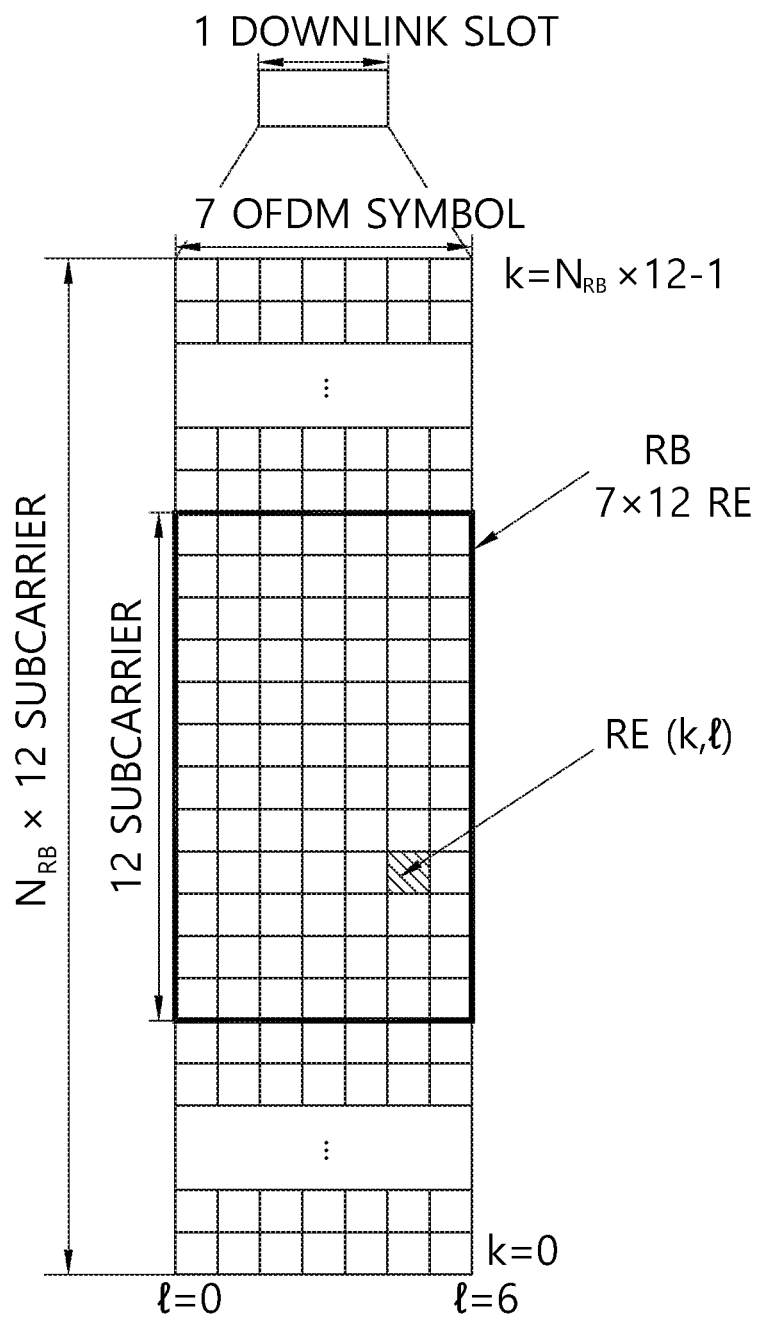
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
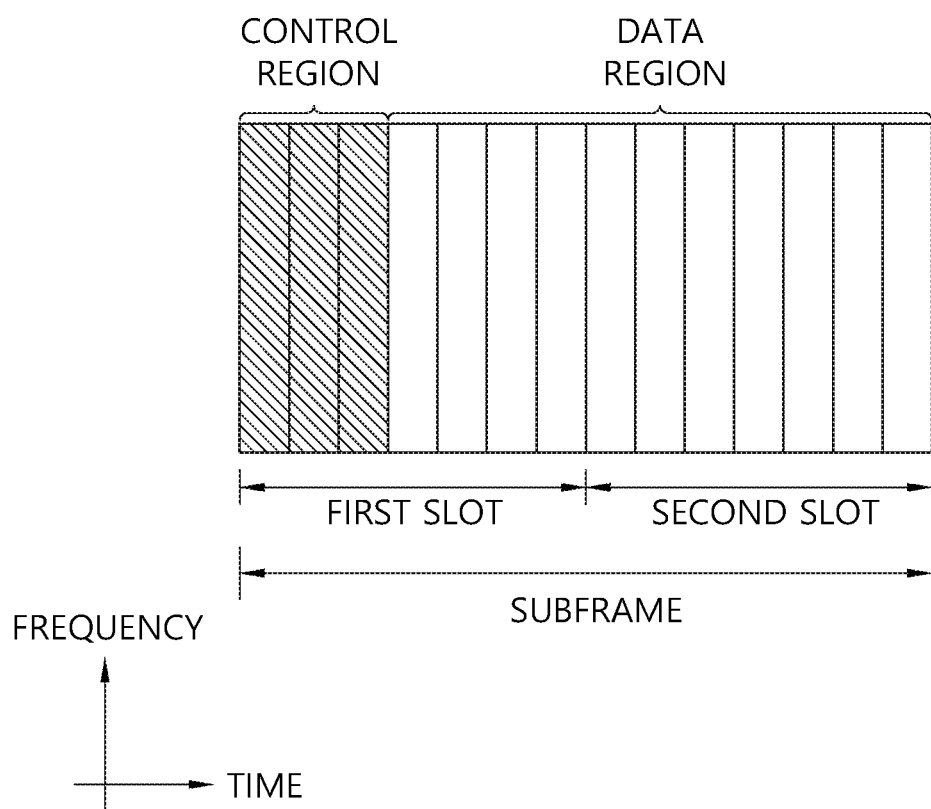
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
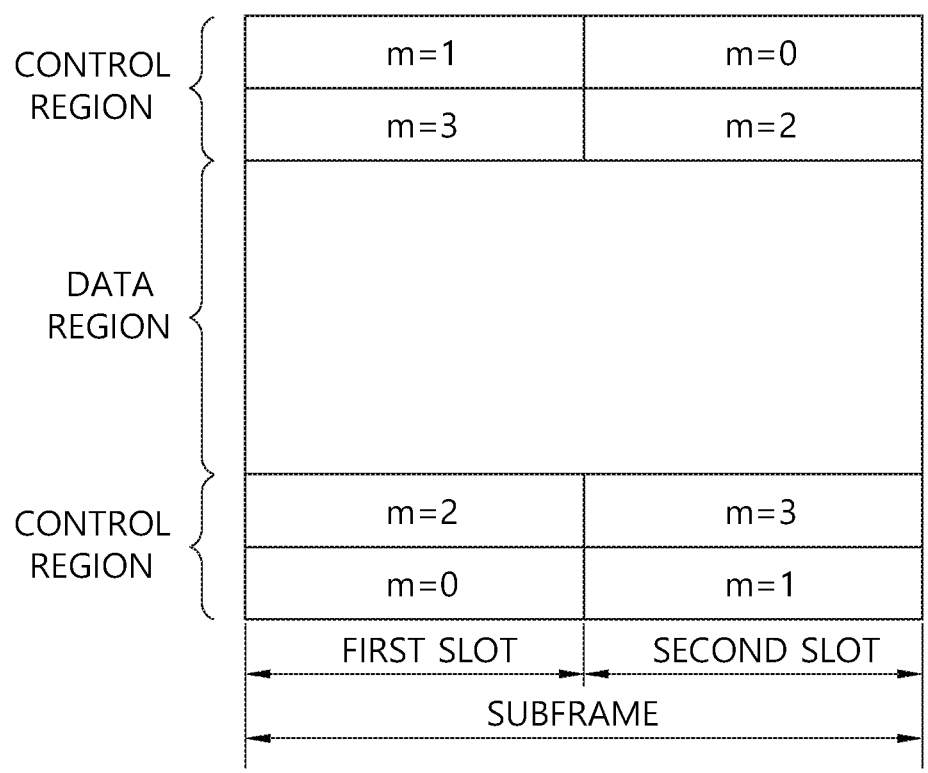
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification. Hereinafter, a MTC UE may be referred to as one of a UE requiring coverage enhancement (CE), a low cost UE, a low end UE, a low complexity UE, a narrow(er) band UE, a small(er) band UE, or a new category UE. Or, just a UE may refer one of UEs described above.

In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

Hereinafter, a method for configuring a frame structure to transmit broadcast and/or unicast data according to an embodiment of the present invention is described.

If a system bandwidth is larger than 1.4 MHz, it is likely that more than one subband may be configured. A subband may refer to a resource allocation unit for MTC UE which may use a narrow bandwidth. A subband may be a part of a system bandwidth. Hereinafter, let's assume that there are M subbands configured for a system bandwidth. Since a UE cannot receive broadcast+unicast or broadcast+broadcast or unicast+unicast simultaneously, and also, a UE may require one slot or one subframe to perform frequency retuning if subband changes, careful considerations on multiplexing should be considered.

Among M subbands configuring the system bandwidth, it may be simply assumed that there is one subband carrying physical broadcast channel (PBCH), and another subband carrying system information block 1 for MTC (hereinafter MTC-SIB1), and another subband carrying system information block 2 for MTC (hereinafter MTC-SIB2), and so on. Each subband may be the same. Or, each subband may be configured by previous channel. For example, PBCH may configure a subband for MTC-SIB1, and MTC-SIB1 may configure a subband for MTC-SIB2. Regardless of subband, a cell-specific subband hopping pattern may be configured. For example, for subband i, it may jump to the location of subband j where j=fk (system frame number (SFN), cell ID). Here, k is the index of hopping pattern. This example shows that hopping occurs in every radio frame. However, the hopping may occur in multiple subframes rather than a radio frame unit.

For primary synchronization signal (PSS)/secondary synchronization signal (SSS)/PBCH reading, the UE may stay in the center 6 PRBs. Subband/frequency hopping may be disabled for PSS/SSS/PBCH. In other words, the center 6 PRBs may always be used to transmit PSS/SSS/PBCH.

For paging reading, if a UE is in RRC_CONNECTED mode, a UE may assume that paging occurs in a subband where the UE is configured to monitor unicast data and/or control signal. If a UE is in RRC_IDLE mode, a UE may assume that the paging subband is configured or indicated by the network based on UE ID or some other means. While a UE is reading paging, it may not be required to receive any other data/control signal until receiving paging message is completed.

For MTC-SIB1 reading, if the MTC-SIB1 is read since MTC-SIB1 update, a UE may not be required to receive any other data/control signal until the MTC-SIB1 reading is completed. If the MTC-SIB1 is read based on UE autonomous behavior (e.g. update SIB due to timer expiration, etc.), the UE may also read other unicast data. If there is on-going unicast transmission, the UE may not be required to receive SIB(s) simultaneously.

For other SIB(s), if a UE reads SIB(s) because of SIB(s) update, a UE may not be required to receive any unicast data until updating SIB(s) is completed.

Figure 6:
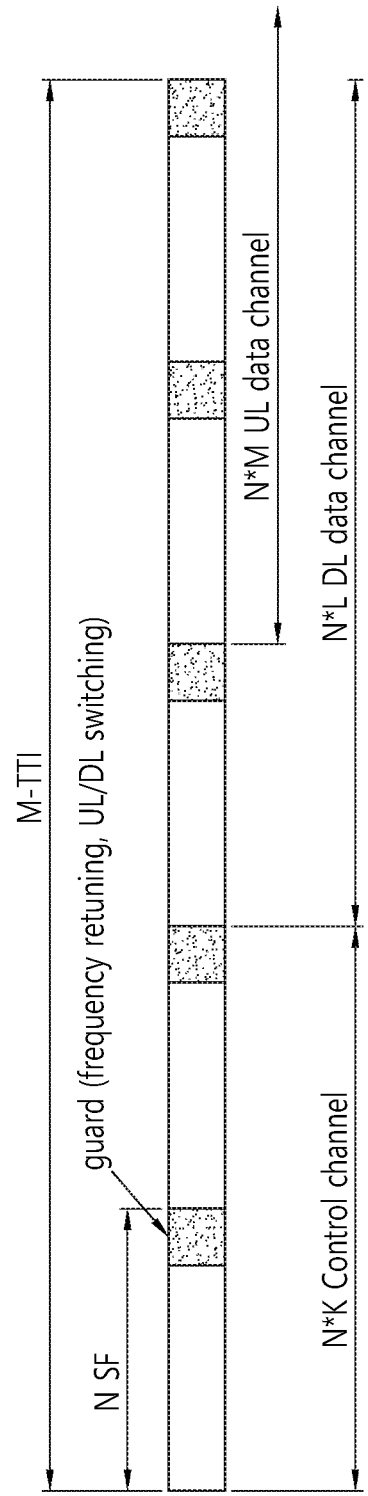
FIG. 6 shows an example of a frame structure for a MTC according to an embodiment of the present invention.

FIG. 6 shows an example of a frame structure for a MTC according to an embodiment of the present invention. Referring to FIG. 6, MTC-TTI (M-TTI) may be configured. M-TTI may refer to a time unit for transmitting data to MTC UEs. M-TTI may be longer than a conventional TTI described in FIG. 2 above. M-TTI may include multiple N subframes. In each N subframes, (N−1) subframes may be used for transmitting data to MTC UEs and channel estimation, and the remaining 1 subframe may be used as a guard period, which allows frequency retuning, UL/DL switching, etc. Frequency retuning gap may not be necessary if frequency retuning latency is small. In the M-TTI, N*K subframes may be used for control channel, and N*L subframes may be used for DL data channel. Further, N*M subframes may be used for UL data channel.

Figure 7:
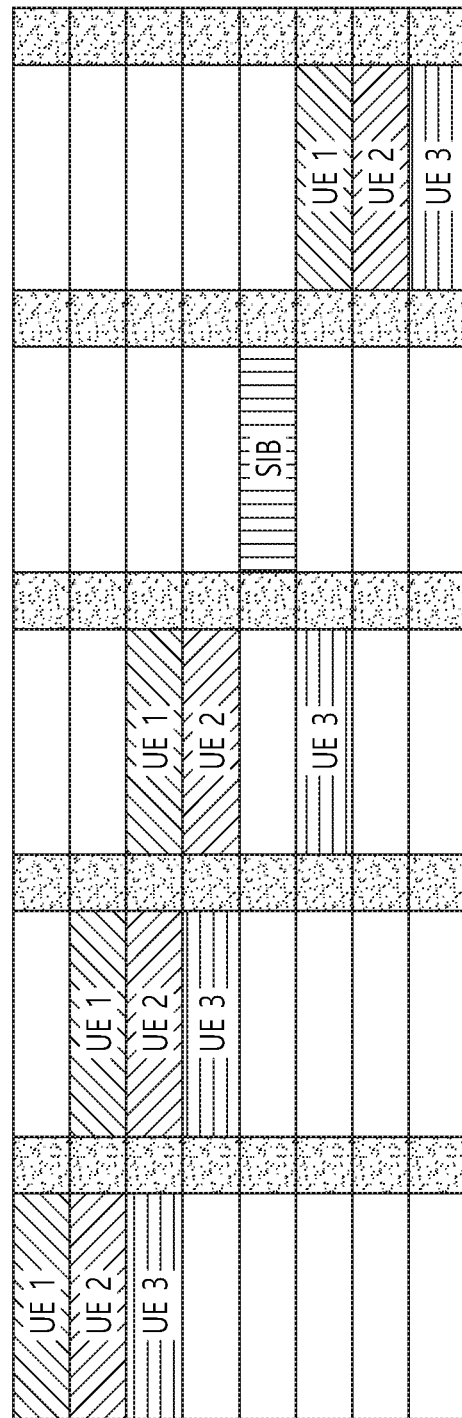
FIG. 7 shows an example of a frequency hopping and UE subband monitoring pattern according to an embodiment of the present invention.

FIG. 7 shows an example of a frequency hopping and UE subband monitoring pattern according to an embodiment of the present invention. To maximize frequency diversity with multi-subframes channel estimation, frequency hopping or switching of subband may occur in every N subframes. Referring to FIG. 7, in every N subframes, the location of subband for each UE changes. Further, to avoid potential collision between unicast data and/or control signal with broadcast data, one subband may be reserved for broadcast data which may not be used for frequency hopping. Referring to FIG. 7, SIB is transmitted in a subband without frequency hopping. Alternatively, frequency hopping of the subband where SIB is carried may be allowed as well.

For the simplicity, a UE may not perform frequency hopping across the system bandwidth within N subframes. The N subframes may be called as frequency hopping subframe group (FH-SFG). Referring to FIG. 7, frequency hopping occurs in every N subframes, but does not occur within each N subframe. Thus, if a UE needs to read broadcast data in different subbands where broadcast data transmission occurs in less than N subframes, the UE may not read unicast data during that N subframes regardless of whether the subframes carry broadcast data. Alternatively, a UE may also read unicast data in a subframe where broadcast data is not transmitted. Moreover, UL/DL switching may not occur within FH-SFG. This may be applied for TDD. In TDD, if a UE is in DL mode, UL subframes may not be utilized in a FH-SFG. And if a UE is in UL mode, DL subframes may not be utilized/monitored within a FH-SFG. If the network wants to utilize all DL/UL subframes, the network may configure N=2, which means that subband/frequency hopping may occur in multiples of FH-SFG rather than in every FH-SFG. More generally, the hopping pattern and/or hopping interval may be configured by the network via master information block (MIB), SIB, or higher layer signaling.

N may be determined as the minimum number or a unit of multi-subframes channel estimation. Separate N may be configured for DL and UL respectively. A UE may assume that multi-subframes channel estimation over N−1 subframes are feasible by maintaining the same subband location and same precoder (if any) over N−1 subframes. Without loss of generality, N−1 (reflecting frequency retuning delay) may be changed to N if retuning gap subframe is not needed.

For determining K (the number of N subframes for control channel), L (the number of N subframes for DL data channel), and M (the number of N subframes for UL data channel), which are described in FIG. 6 above, at least one of the following approaches may be considered.

(1) (N−1)*K may be the maximum number of repetition in subframes to carry one DCI given a CE level configured to a UE. In other words, only one DCI may be carried in N*K subframes. N and/or K may be different per CE level. For the simplicity, CE level may be different per subband such that the same K may be used in a subband (i.e. a UE with the same CE level is configured to the same subband). In this case, (N−1)*L may be the maximum number of repetition in subframes to carry one PDSCH given a CE level. If this approach is used, it is likely that only one UE may be scheduled in one M-TTI. Thus, it may increase the overall latency to be able to receive data for a given UE.

(2) (N−1)*K subframes may carry more than one DCI given a CE level configured to a subband. That is, in one M-TTI, multiple control channels may be carried. For DL data, (N−1)*L subframes may be configured such that it may carry only one PDSCH or multiple PDSCHs. N*K may be the maximum number of repetition in subframes assuming the smallest aggregation level (AL) that a UE monitors for a given CE level. For example, if the smallest AL=1 (this may require 2 PRBs per subframe), it may require 20 repetitions, so (N−1)*K may be 20. In this case, at least three DCIs with AL=1 may be multiplexed assuming 6 PRBs per subframe. More generally, if a UE monitors "m" ALs where each AL level i requires total required resource (TRR) TRR (i), (N−1)*K*6 may be defined as TRR(1)*p or TRR(m)*p where p is the number of DCIs per M-TTI.

A UE may monitor multiple ALs and/or multiple repetition numbers. For each approach described above, regardless of which approach is used, a UE may monitor only one DCI in one M-TTI. If a UE detects one DCI, it may stop monitoring on DCI in the same M-TTI. In this case, ULU grant and DL grant may not be delivered simultaneously within one M-TTI. Alternatively, a UE may monitor at most one DL scheduling DCI and at most one UL grant in one M-TTI. In this case, the UE may assume that it came in the same set of subframes. Thus, if a UE detects one DCI, it may not monitor other subframes any further. Each approach may be expanded over multiple times. Alternatively, starting and end subframe of DCI repetition may vary within MTC-DCI (M-DCI) region.

Figure 8:
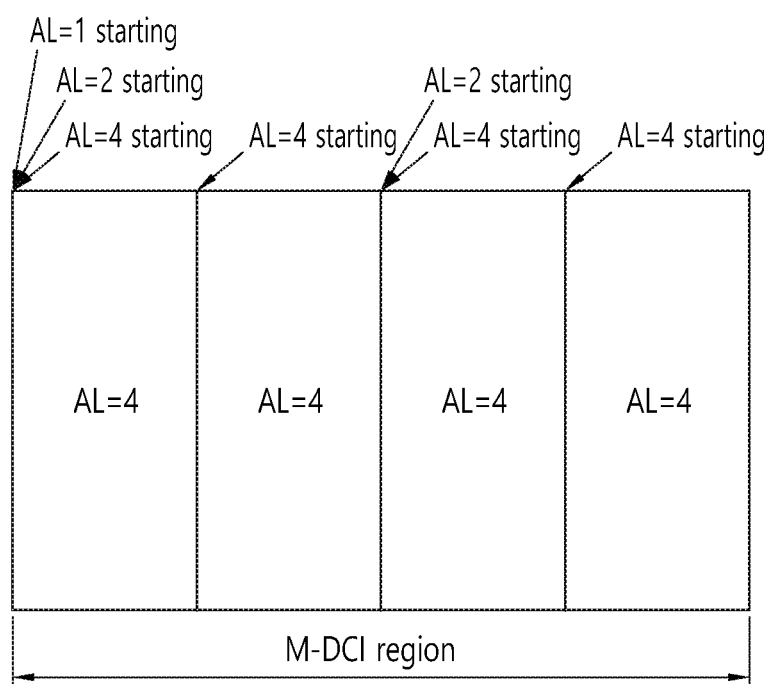
FIG. 8 shows an example of DCI transmission with different ALs within one M-TTI according to an embodiment of the present invention.

FIG. 8 shows an example of DCI transmission with different ALs within one M-TTI according to an embodiment of the present invention. FIG. 8 corresponds to a case that the same repetition (resource) level is kept across M-DCI region.

Figure 9:
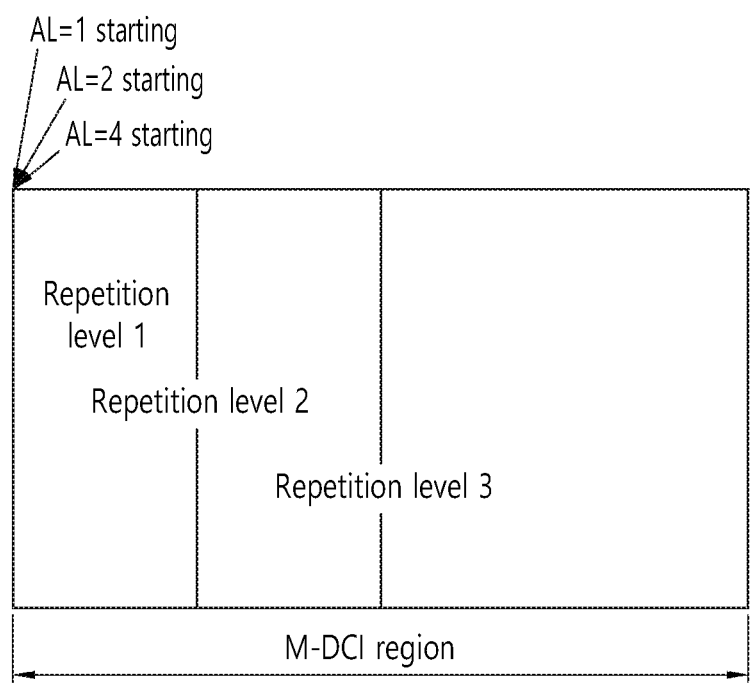
FIG. 9 shows another example of DCI transmission with different ALs within one M-TTI according to an embodiment of the present invention.

FIG. 9 shows another example of DCI transmission with different ALs within one M-TTI according to an embodiment of the present invention. FIG. 9 corresponds to a case that the repetition level changes across M-DCI region.

Figure 10:
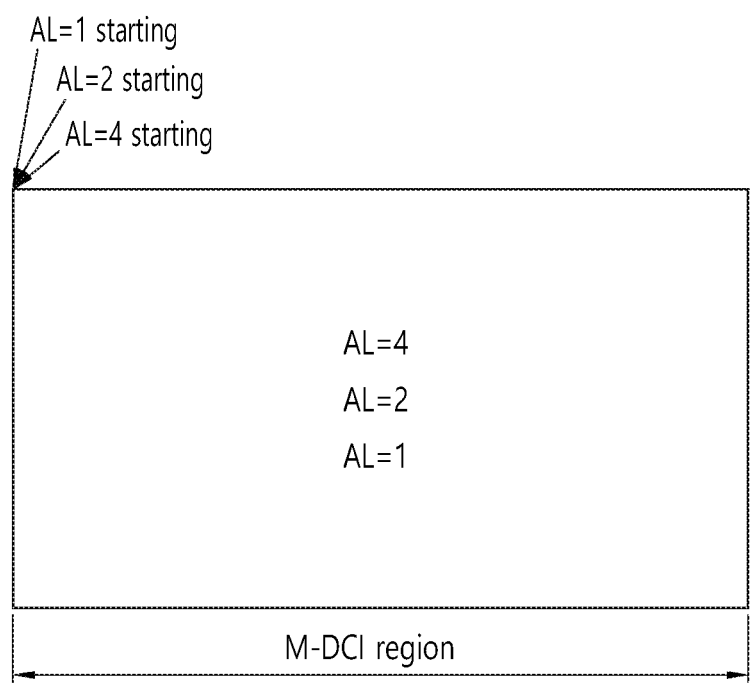
FIG. 10 shows another example of DCI transmission with different ALs within one M-TTI according to an embodiment of the present invention.

FIG. 10 shows another example of DCI transmission with different ALs within one M-TTI according to an embodiment of the present invention. FIG. 10 corresponds to a case that the repetition subframe is constant.

If one M-TTI includes multiple PDSCHs (for different UEs), the timing between control channel and PDSCH needs to be determined. For this, at least one of the following approaches may be considered.

(1) Implicit association: starting subframe and/or end subframe within M-DCI region may determine the starting subframe of PDSCH. For example, one M-TTI may include maximum two PDSCHs, the candidate starting subframe for two PDSCHs may be represented as Starting_SF_PDSCH1 and Starting_SF_PDSCH2 respectively. When a UE is scheduled with a DCI which ends earlier than the end of M-DCI region, the UE may assume that Starting_SF_PDSCH1 is the starting subframe of the scheduled PDSCH. Otherwise, the UE may assume that Starting_SF_PDSCH2 is the starting subframe of the scheduled PDSCH. (E)CCE or resource index used for control channel may also be used to implicitly refer the starting subframe for PDSCH.

(2) When creating CRC, starting subframe of PDSCH may be embedded. For example, if four possible starting positions for PDSCHs are available, one value from {0, 1, 2, 3} may be added to CRC. When a UE decodes control channel, the UE may also blindly detects the starting position of PDSCH.

(3) Explicit indication from DCI
(4) Semi-static configuration to a UE
(5) Semi-static configuration to a UE+implicit from DCI and/or SFN and/or starting subframe index: for example, an offset to each UE may be configured, and the starting subframe for PDSCH may be determined implicitly from the control channel and/or SFN value and/or starting subframe index and/or (E)CCE or resource index used for control channel.

For handling of multiple PDSCHs, multiple HARQ processes may be considered. If a UE supports multiple HARQ processes, depending on the data rate that the UE may want to achieve and the network may want to support, possible number of concurrent HARQ processes may change. To support this, a UE may signal its capability on the number of HARQ processes it may support, if it is allowed as a capability to support multiple HARQ processes. The network may also indicate the number of HARQ processes that the network supports via MIB, SIB, random access response (RAR) or higher layer signaling. When more than one HARQ processes (e.g. "p" processes) are supported, the M-TTI may be determined such that it may accommodate more than "p" PDSCHs which may be scheduled simultaneously. In this case, to minimize the control channel overhead, DL scheduling DCI may include a bitmap of HARQ processes which will be scheduled. In other words, one DCI may be shared among multiple PDSCHs with different HARQ-process-ID assuming that resource allocation, modulation and coding scheme (MCS), and transport block size (TBS) are the same across different HARQ processes. If this is used, a separate new data indicator (NDI) per each HARQ process may be needed.

For subframe architecture for control signal/unicast data/broadcast data, one of the following options may be considered.

(1) Time division multiplexing (TDM) between different types of channel (no subframe is able to carry more than one channel type)
(2) Frequency division multiplexing (FDM) between unicast data and broadcast data+TDM between control signal and data
(3) FDM between different types of channel
(4) eNB scheduling based control Regardless of which option is used, if a UE is configured with a subband which is also used for transmitting broadcast data such as SIB, paging, the UE may assume that control signal/unicast data will not be scheduled in a subframe which is allocated for potential transmission of broadcast channel (e.g. SIB occasion or paging occasion). This assumption may be applied regardless of UE detection on broadcast channel or not.

Also, multicast broadcast single frequency network (MBSFN) subframes may not be used for transmitting unicast data as well. To cover various cases where possibly some subframes may not be used for unicast data repetition, a set of subframes used for unicast data may be configured per each subband. However, regarding MBSFN, MBSFN subframe(s) may be also used for unicast data repetition. In this case, additional signaling on which subframe(s) out of MBSFN subframe(s) may be used for unicast data transmission if necessary. If this additional signaling is not provided, the UE may assume that MBSFN subframes may not be used for unicast data transmission/repetition. Moreover, it is also possible that MBSFN subframe for MTC UE is different from that for legacy UEs. Also, since MBMS service may not be continuously transmitted, the repetition may occur in some cases and may not occur in some other cases. To support this, whether the unicast data is scheduled in MBSFN subframe or not may be signaled by DCI. If DCI indicates that unicast data may be scheduled in MBSFN subframe, a UE may assume that repetition occurs over MBSFN subframes. Otherwise, the UE may assume that MBSFN subframes may be skipped for unicast data repetition.

If a MTC UE is configured with a set of valid DL subframes, the reference signal (RS) pattern may be the same regardless of whether the subframe is MBSFN subframe or not. Another approach is to read MBSFN configuration and MBSFN subframe which is valid may be assumed to carry only demodulation RS (DM-RS) (no presence of legacy cell-specific RS (CRS)). If MBSFN SF configuration is not available, the same RS pattern which may be further indicated to MTC UEs what is the common RS pattern may be assumed. RS may be one of the followings.

(1) DM-RS for MTC UEs control signal and/or data
(2) Legacy CRS which may also be used for MTC UEs
(3) Legacy CRS which may be assumed as zero-power CRS such that data may be rate matched around them Common RS pattern may be
Only (1) is used
(1)+(2) are used
(1)+(3) are used
Only (2) are used What type of pattern is used may be higher layer signaled or broadcast via MIB/SIB.

Also, it is possible that a MTC UE is not aware of any MBSFN configuration nor MBMS configuration. In this case, the starting OFDM symbol for a MTC UE with narrow bandwidth may be fixed regardless of MBSFN subframe or not. In other words, the same starting OFDM symbol may be used regardless of subframe type. In this case, a UE may also assume that CRS will be present in subframes which are configured to monitor. By SIB and/or MIB, the set of subframes usable for MTC UEs may be configured separately or independently from MBSFN configuration. Thus, there may be skipped subframes which will not be used for transmission to MTC UEs. The different sets of subframes may be configured for a MTC UE in normal coverage and in coverage enhancement modes. Furthermore, separate sets of subframes may also be configured per each CE level or per subband region.

Figure 11:
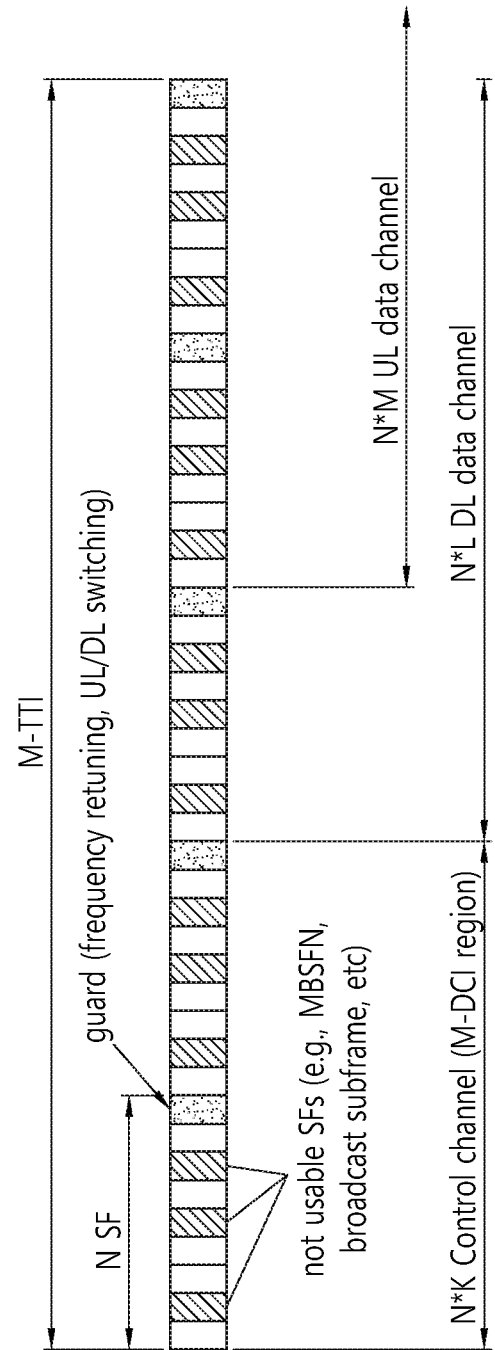
FIG. 11 shows another example of a frame structure for a MTC according to an embodiment of the present invention.

FIG. 11 shows another example of a frame structure for a MTC according to an embodiment of the present invention. Referring to FIG. 11, skipped subframes which will not be used for MTC transmission are considered. In each N subframes, there is a first set of subframes which can be used for MTC transmission and a second set of subframes which cannot be used for MTC transmission. Depending on the number of subframes not usable for repetition, a length of M-TTI may change even in the same subband.

Hereinafter, a method for handling a starting subframe in a frame structure for MTC according to an embodiment of the present invention is described. Along with handling a starting subframe in a frame structure for MTC, period configuration and/or 1024 radio frames wrap-around issue will be discussed. In terms of control channel monitoring period, it may be beneficial to implicitly derive the starting subframes of control channel monitoring. Since there may be a number of invalid subframes in L subframes (e.g. L=40), some restrictions on how to implicitly derive starting subframes of control channel monitoring needs to be clarified. In the description below, the repetition number for a control channel may be 1, 2, 4 . . . $2^q$ where $2^q$ is the maximum repetition number of control channel. For deriving the starting subframe and determining period of control channel, at least one of the following options may be considered.

(1) L may be sufficiently large to cover the number of valid subframes within L subframe. That is, L subframes may cover $2^q$ subframes in any case. In this case, starting subframe of each repetition level may be determined within L subframes (and may be repeated across L subframes).

Figure 12:
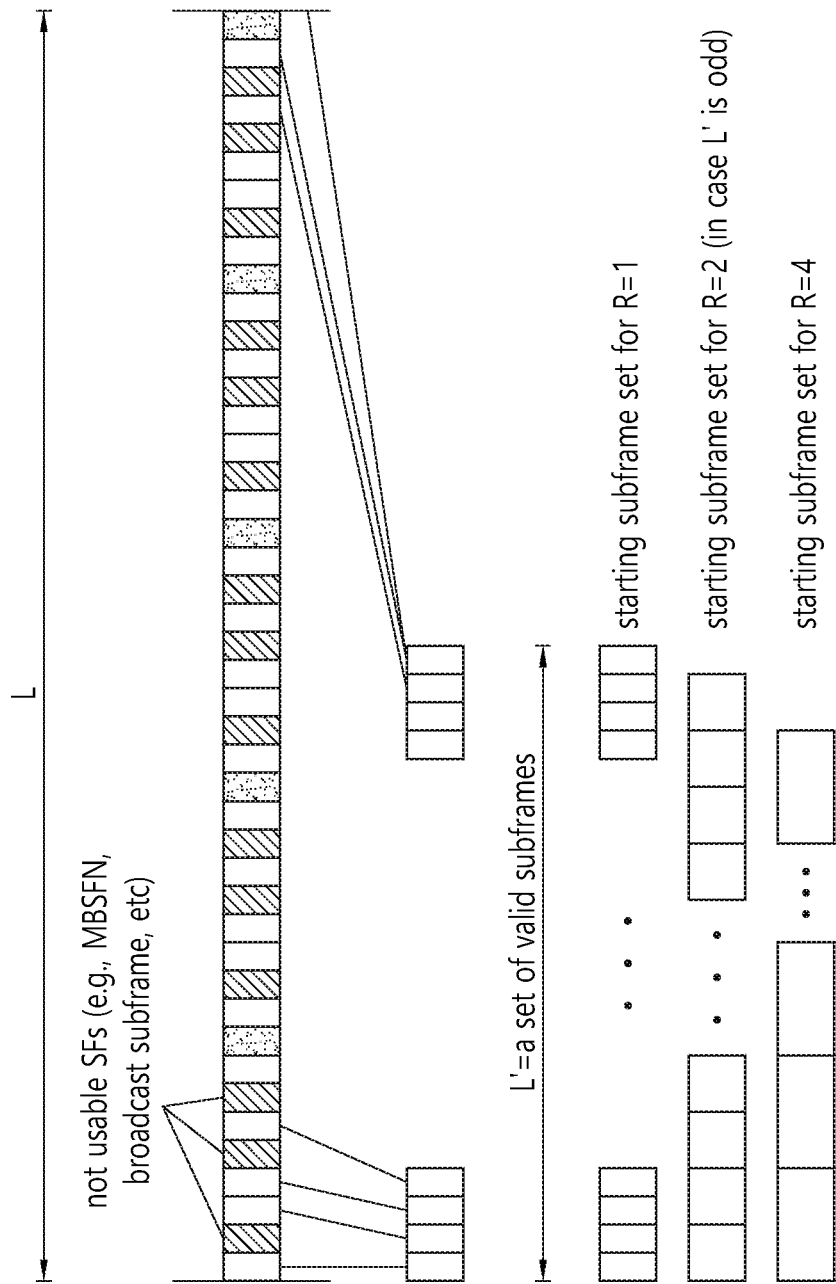
FIG. 12 shows an example of starting subframes in a frame structure for a MTC according to an embodiment of the present invention.

FIG. 12 shows an example of starting subframes in a frame structure for a MTC according to an embodiment of the present invention. Referring to FIG. 12, within L subframes, there is L' subframes (either DL or UL) which are valid subframes for MTC transmission. Among L' subframes, starting subframe sets for each repetition level (R) may be i*R, where i=0, 1 . . . L'/R−1. In this case, some subframes in each L' subframes may not be used for high repetition level. For example, referring to FIG. 12, the last some subframes within L' subframes may not be used for repetition level 2 and 4 in case that L' is odd.

(2) The network may configure the number of valid subframes (i.e. L') which can be divided by repetition level (R). For example, L' may be 16. In this case, then the repetition level of 32 occurs across two L durations. In this case as well, the starting subframe sets may be derived implicitly. If any repetition level R is larger than L', starting may start from SFN=0.

Figure 13:
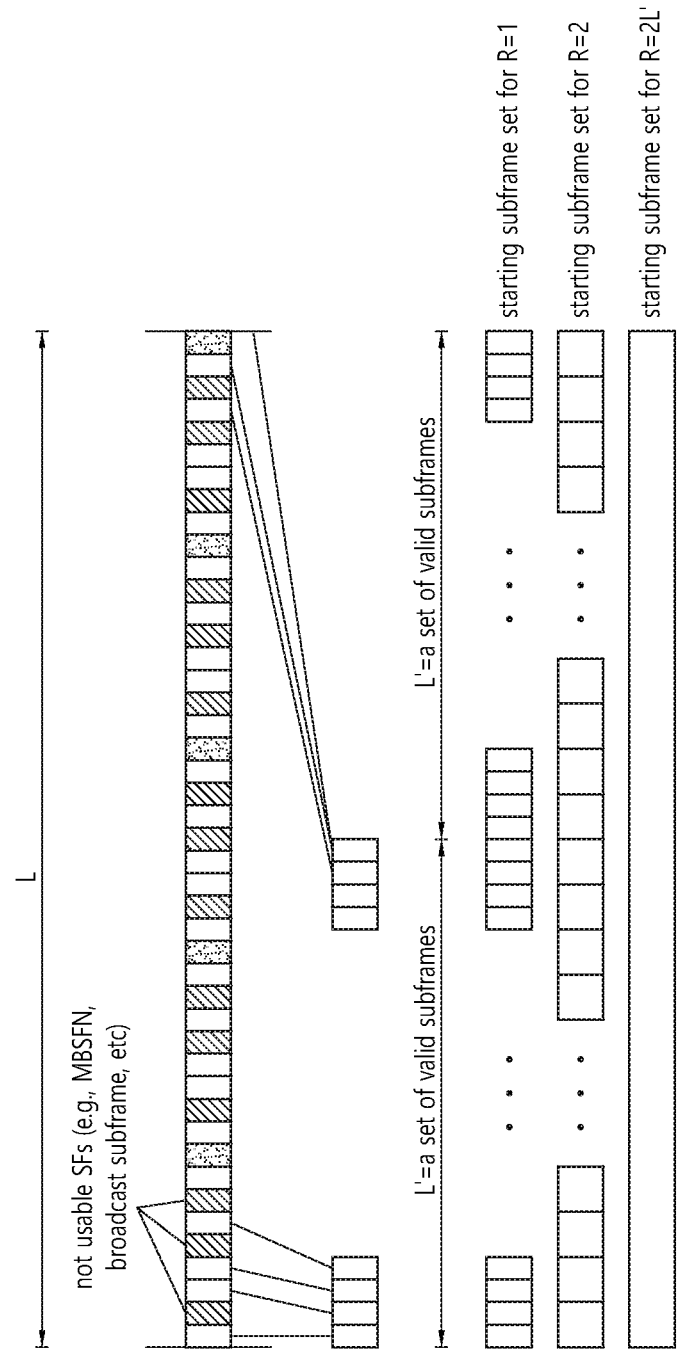
FIG. 13 shows another example of starting subframes in a frame structure for a MTC according to an embodiment of the present invention.

FIG. 13 shows another example of starting subframes in a frame structure for a MTC according to an embodiment of the present invention. Referring to FIG. 13, L' subframes may be configured so that the maximum repetition level R=2L'. For example, L' may be 16 and the maximum repetition level may be 32. In this case, there is no subframe which is not used for high repetition level in each L' subframes.

(3) A cell common period may be configured. The options describe above may restrict the available subframes for data transmission. Therefore, it may be generally desirable that period P is configured which may be applied over legacy subframes (i.e. including unusable subframes) rather than over valid subframes. The period P may be a cell specific value. The period P may behave similar to L. For each repetition level, starting subframe sets may be defined implicitly within the period P, and then, the starting subframe sets may be reset in every period P. For example, L=40 and P=120 if L'=15 and the maximum R=32. In other words, to minimize the signaling overhead of L (bitmap indicating valid subframe sets) and maximize the availability, additional parameter indicating the period to reset the starting subframe sets may be configured. The period may be preconfigured as well, e.g. based on the maximum repetition number and the minimum available subframes.

Figure 14:
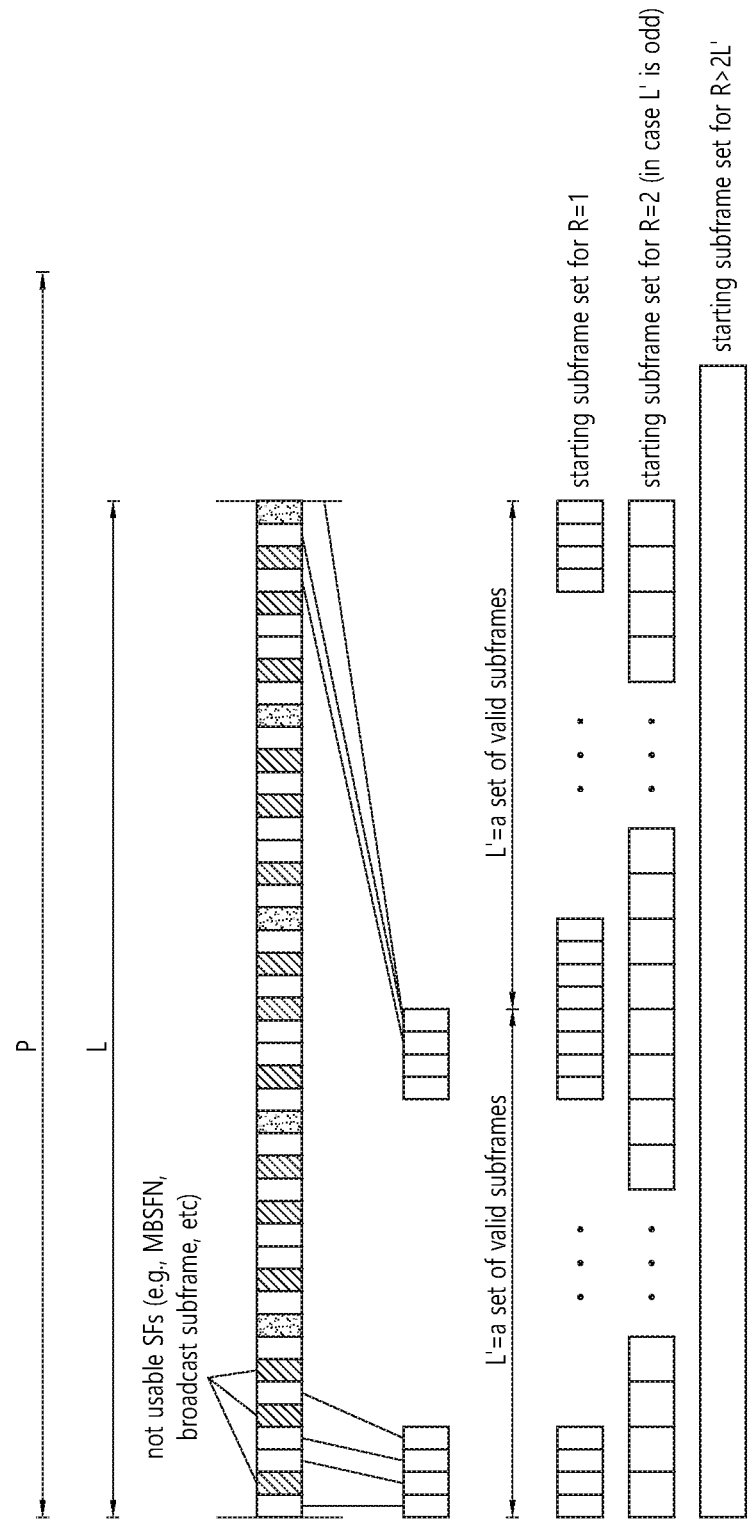
FIG. 14 shows another example of starting subframes in a frame structure for a MTC according to an embodiment of the present invention.

FIG. 14 shows another example of starting subframes in a frame structure for a MTC according to an embodiment of the present invention. Referring to FIG. 14, the period P, which may be longer than L, may be configured. The period P may be configured considering unusable subframe sets as well as valid subframe sets. That is, the period may be multiple of L. Within the period P, starting subframe sets may be defined implicitly for each repetition level. The starting subframe sets may be reset in every period P.

(4) UE-specific starting duration configuration (or per CE level or per repetition level) may be configured. In this case, the starting subframe sets may be applied based on legacy subframes (not based on valid subframes only). When UE-specific starting duration configuration is configured, starting subframe sets for each UE may be configured by TDM. If the number of valid subframes is less than the repetition level R in any monitoring instance, a UE may assume that there may be no control channel transmitted in that period. Alternatively, 2*R subframes may be always used for starting subframe sets. Or, K*R subframes may be always used for starting subframe sets, where K may be configurable (per cell or per CE level). This may have some benefit of UE multiplexing with UE battery saving particularly in large coverage case.

(5) Starting subframe may be determined based on the number of valid subframes starting from SFN=0 of subframe index=0. If there are remaining subframes within 1024 radio frames after repetition, the remaining subframes may not be used for M-PDCCH repetition. In other words, in every 1024 radio frames, the starting subframe counting may start again (i.e. not cross over in the radio frame number wrap-around region). A UE may assume that the valid DL subframe sets may not be changed within 1024 radio frames.

(6) For option (5) described above, if ambiguity occurs with valid DL subframe update, it may last up to 1024 radio frames in the worst case. To minimize impact in the worst case, another implicit mechanism is that the closest radio frame number covering the maximum repetition level configured by the network or maximum repetition level configured to the specific narrowband is used to reset the starting subframe. For example, if a narrowband is configured with repetition number of 8, 16 and 32, it may take 32 as the maximum repetition level, and if there are 10 invalid subframes within 40 ms, the closest radio frame number to cover 32 repetition may be 5, then it may be assumed that the starting subframe sets of repetition level 8, 16, and 32 may be reset in every 5 radio frames. This option may be used along with option (5) to handle radio frame wrap-around issue. Though it is mentioned with existing configuration, the principle may be applied to other numbers of maximum radio frame in the system and/or the size of valid subframes indication for DL.

(7) A UE may assume that the valid DL subframes are not changed during the RRC-CONNECTED mode with option (5) described above.

Further, a UE may be expected to monitor MTC-PDCCH (M-PDCCH) starting from a starting subframe indicated by one of the options described above, unless the UE performs at least one of the followings:

A UE monitors cell common data, such as SIB, RACH procedure related message, paging A UE monitors/receives scheduled PDSCH A UE transmits any UL transmission in half-duplex FDD (HD-FDD)

A UE performs measurement

In case a UE finishes the above behavior in the middle of one occasion of M-PDCCH monitoring, the UE may skip the current monitoring occasion and may start monitoring in the next available M-PDCCH monitoring occasion.

In case of PHICH or ACK/NACK (via NDI) timing of PUSCH, the first available M-PDCCH monitoring occasion after n+k (where n is the last subframe of PUSCH transmission, and k is, e.g. 4) is assumed.

Further, for example, there may be only one narrowband available since the UE is operating in small system bandwidth (e.g. 200 kHz or 1.4 MHz) or only one narrowband is allocated to MTC UEs. In this case, it is necessary to partition control signal and data, as well as to partition cell common data and unicast data. In such a case, the options for handling a starting subframe described above may be applied within a control region. Also, if legacy subframe index or SFN is used, P or L may be divisor of 1024 such that there may be no case of ambiguity when SFN wrapping occurs.

M-PDCCH scheduling PDSCH may include a scheduling indicator (SI) to indicate subband and/or the starting subframe of scheduled PDSCH/PUSCH (i.e. gap between M-PDCCH and PDSCH). Table 1 shows an example of a set of SIs.

TABLE 1

| SI | Subband location | Starting subframe |
|---|---|---|
| 0 | +1 | +0 |
| 1 | −1 | +0 |
| 2 | +0 | +1 |
| 3 | +0 | +2 |

Also in terms of monitoring sets of starting subframes, the starting subframe sets and the duration per each starting subframe sets (or the interval between two consecutive starting subframes) may also be configured. A UE may expect control signals transmitted during the duration starting from a starting subframe. More generally, a UE may be configured with a period and offset where the UE may start monitoring of bundled control channel transmission. For example, period can be 200 subframes, i.e. 200 ms (counting only valid DL subframes for MTC), and offset may be 50 subframes, i.e. 50 ms. In this case, starting from the first subframe out of 200 subframes, the UE may start to aggregate control channel reception in 50th subframe. Another approach is to configure period and offset in SFN and subframe index regardless of valid subframes. In this case, the actual number of subframes usable for repetition within one period may be smaller than the period. If the former is used, the starting subframe index or SFN may be also configurable. For example, 200 subframes may start from SFN=0 with subframe index=0 (if subframe index=0 is usable for MTC).

Figure 15:
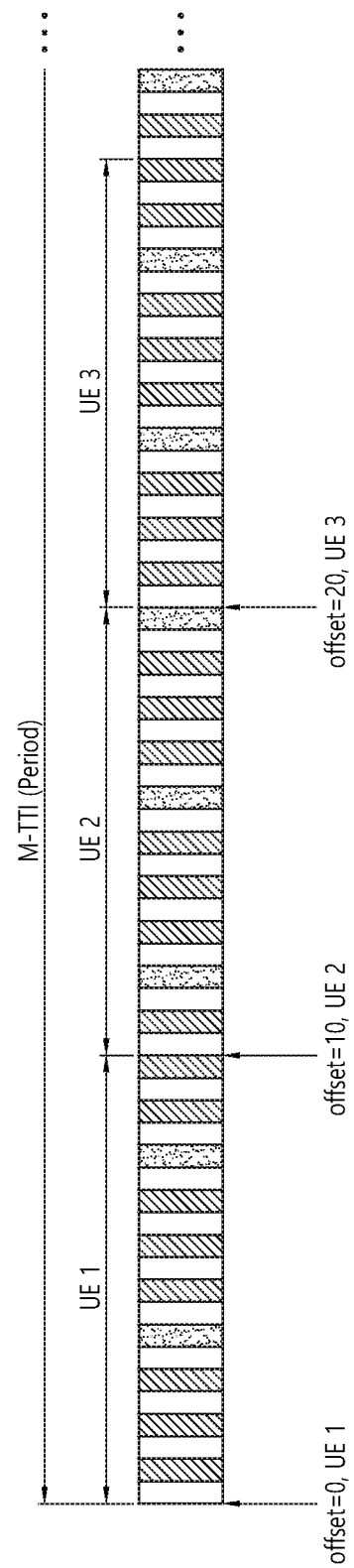
FIG. 15 shows an example of an offset configured for each UE to monitor a control channel according to an embodiment of the present invention.

FIG. 15 shows an example of an offset configured for each UE to monitor a control channel according to an embodiment of the present invention. Referring to FIG. 15, UE 1 is configured with offset 0, and accordingly, UE 1 starts monitoring from subframe 0 in M-TTI. UE 2 is configured with offset 10, and accordingly, UE 2 starts monitoring from subframe 10 (among valid subframes) in M-TTI. UE 3 is configured with offset 20, and accordingly, UE 3 starts monitoring from subframe 20 (among valid subframes) in M-TTI.

In summary, the present invention described above proposes valid DL (V-DL) subframes and valid UL (V-UL) subframes for MTC UEs. V-DL subframes refer to DL subframes usable for MTC UEs in repetition. A different subframe set may be configured for control channel and data channel respectively, or UE-specific search space (USS) and cell-specific search space (CSS) respectively, or per CE level. If no configuration is given, a UE may assume that non-MBSFN subframes are V-DL subframes. For UL, if there is no configuration is given, all UL subframes may be assumed as valid/available.

Further, the present invention described above proposes period/offset/duration configuration of control channel monitoring subframes. In the period of control channel repetition, a UE may expect at most one DL grant (for unicast data), at most one UL grant, and at most one DL grant for common data during the interval. Offset is the starting subframe offset from the starting of each period. Duration is to specify the duration of control channel transmission from a specific UE perspective, and how long the UE may need to monitor subframes for control channel reception per each interval. For UL, separate period/offset/duration for UL data channel may also be configured. Similarly, for DL, separate period/offset/duration for DL data channel may also be configured. Alternatively, starting offset for data channel may be indicated by control channel.

Figure 16:
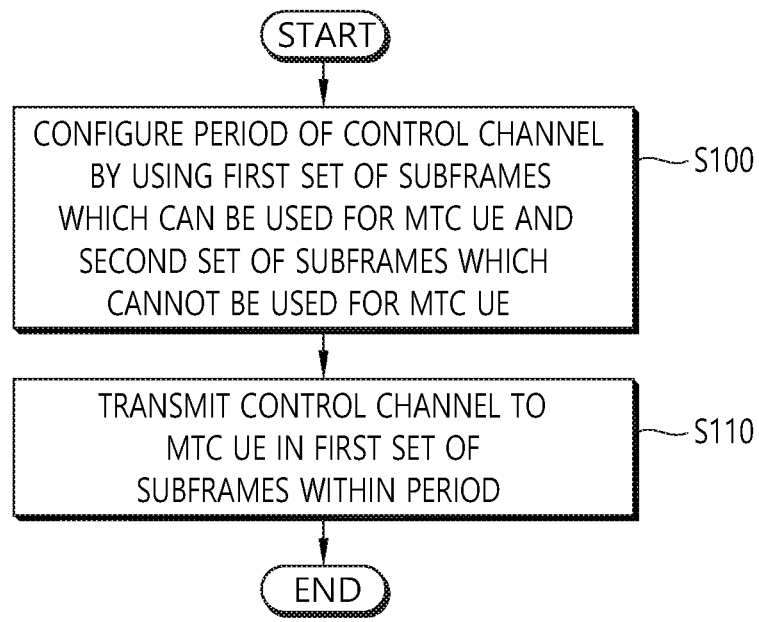
FIG. 16 shows a method for transmitting, by a BS, a control channel to a MTC UE according to an embodiment of the present invention.

FIG. 16 shows a method for transmitting, by a BS, a control channel to a MTC UE according to an embodiment of the present invention. This embodiment may correspond to option (3) through option (5) described above.

In step S100, the BS configures a period of a control channel by using a first set of subframes which can be used for a MTC UE and a second set of subframes which cannot be used for the MTC UE. The period may be a cell-specific value. The period may be configured based on at least one of a maximum repetition level or a minimum available subframes.

In step S110, the BS transmits the control channel to the MTC UE in the first set of subframes within the period. The control channel may be transmitted from one subframe among starting subframe sets of the control channel. The starting subframe sets of the control channel may be configured implicitly within the period. The starting subframe sets of the control channel may be configured for each repetition level of the control channel. The starting subframe sets of the control channel may be configured per UE. The starting subframe sets of the control channel may be configured based on both the first set of subframes and the second set of subframes. The starting subframe sets of the control channel may be configured based on a number of subframes in the first set of subframes from system frame number (SFN)=0 of subframe index=0. The starting subframe sets of the control channel may be reset in every 1024 radio frame.

Figure 17:
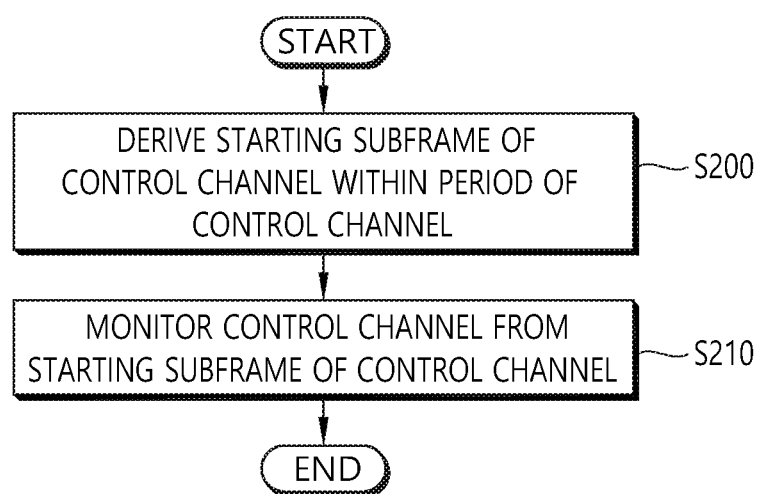
FIG. 17 shows a method for monitoring, by a MTC UE, a control channel according to an embodiment of the present invention.

FIG. 17 shows a method for monitoring, by a MTC UE, a control channel according to an embodiment of the present invention. This embodiment may also correspond to option (3) through option (5) described above.

In step S200, the MTC UE derives a starting subframe of a control channel among starting subframe sets of the control channel within a period of the control channel. The period of the control channel is configured by using a first set of subframes which can be used for the MTC UE and a second set of subframes which cannot be used for the MTC UE.

In step S210, the MTC UE monitors the control channel from the starting subframe of the control channel. The starting subframe sets of the control channel may be configured implicitly within the period. The starting subframe sets of the control channel may be configured for each repetition level of the control channel. The starting subframe sets of the control channel may be configured per UE. The starting subframe sets of the control channel may be configured based on both the first set of subframes and the second set of subframes. The starting subframe sets of the control channel may be configured based on a number of subframes in the first set of subframes from system frame number (SFN)=0 of subframe index=0. The starting subframe sets of the control channel may be reset in every 1024 radio frame.

Figure 18:
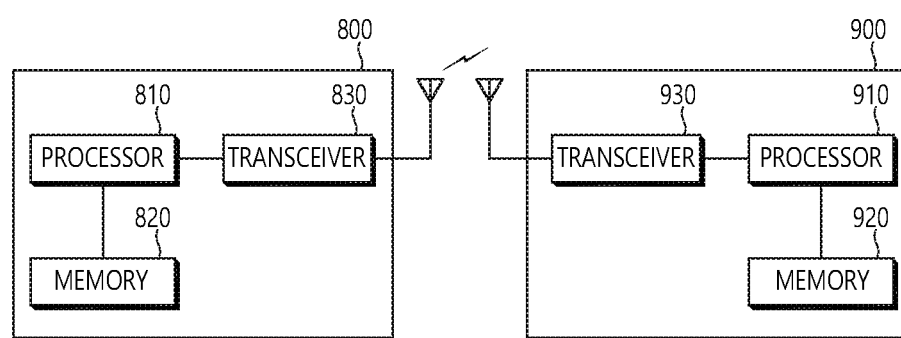
FIG. 18 shows a wireless communication system to implement an embodiment of the present invention.

FIG. 18 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a wireless device in a wireless communication system, the method comprising:
   monitoring a machine type communication-physical downlink control channel (M-PDCCH), wherein the monitoring of the M-PDCCH comprises monitoring M-PDCCH repetitions related to the M-PDCCH in subframes based on a repetition level; and
   stopping the monitoring of the M-PDCCH based on that the M-PDCCH repetitions occur within i) one or more frames including a frame with system frame number (SFN) 0 in a first time period, and ii) one or more frames in a second time period before the first time period,
   wherein each of the first time period and the second time period has a length of 1024 frames, and starts from a frame with SFN 0.

2. The method of claim 1, further comprising:
   monitoring the M-PDCCH starting from a starting subframe.

3. The method of claim 2, wherein the starting subframe is a subframe among starting subframe sets of the M-PDCCH.

4. The method of claim 3, wherein the starting subframe sets of the M-PDCCH are configured for each repetition level of the M-PDCCH.

5. The method of claim 3, wherein the starting subframe sets of the M-PDCCH are configured per wireless device.

6. The method of claim 3, wherein the starting subframe sets of M-PDCCH are configured based on a number of valid subframes starting from a subframe with index 0 in a frame with SFN 0.

7. The method of claim 1, wherein the wireless device is a MTC user equipment (UE).

8. The method of claim 1, further comprising:
decoding a next M-PDCCH having a cyclic redundancy check (CRC) to obtain a starting subframe of a physical downlink shared channel (PDSCH) scheduled by the next M-PDCCH; and
receiving the PDSCH repetitively in subframes starting from the starting subframe of the PDSCH,
wherein the starting subframe of the PDSCH is embedded in the CRC of the next M-PDCCH.

9. A wireless device in a wireless communication system, the wireless device comprising:
a memory;
a transceiver; and
at least one processor, operably coupled to the memory and the transceiver, and configured to:
monitor a machine type communication-physical downlink control channel (M-PDCCH), wherein the monitoring of the M-PDCCH comprises monitoring M-PDCCH repetitions related to the M-PDCCH in subframes based on a repetition level; and
stop the monitoring of the M-PDCCH based on that the M-PDCCH repetitions occur within i) one or more frames including a frame with system frame number (SFN) 0 in a first time period, and ii) one or more frames in a second time period before the first time period,
wherein each of the first time period and the second time period has a length of 1024 frames, and starts from a frame with SFN 0.

10. The wireless device of claim 9, wherein the at least one processor is further configured to:
monitoring the M-PDCCH starting from a starting subframe.

11. The wireless device of claim 10, wherein the starting subframe is a subframe among starting subframe sets of the M-PDCCH.

12. The wireless device of claim 11, wherein the starting subframe sets of the M-PDCCH are configured for each repetition level of the M-PDCCH.

13. The wireless device of claim 11, wherein the starting subframe sets of the M-PDCCH are configured per wireless device.

14. The wireless device of claim 11, wherein the starting subframe sets of the M-PDCCH are configured based on a number of valid subframes starting from a subframe with index 0 in a frame with SFN 0.

15. The wireless device of claim 9, wherein the at least one processor is further configured to:
decode a next M-PDCCH having a cyclic redundancy check (CRC) to obtain a starting subframe of a physical downlink shared channel (PDSCH) scheduled by the next M-PDCCH, and
control the transceiver to receive the PDSCH repetitively in subframes starting from the starting subframe of the PDSCH,
wherein the starting subframe of the PDSCH is embedded in the CRC of the next M-PDCCH.

* * * * *